3,452,051
DEOXYFRENOLICINS
Ernest Leonard Patterson, Pearl River, N.Y., Howard Arnold Whaley, Kalamazoo, Mich., and George Alfred Ellestad, Pearl River, N.Y., assignors to American Cyanamid Company, Stamford, Conn., a corporation of Maine
No Drawing. Filed Sept. 1, 1967, Ser. No. 664,936
Int. Cl. C07d 7/20
U.S. Cl. 260—345.2      5 Claims

ABSTRACT OF THE DISCLOSURE

The invention relates to a new chemical compound designated deoxyfrenolicin which is produced from the known compound frenolicin by catalytic hydrogenation or potassium iodide reduction. The new compound, as well as various derivatives thereof, such as acetyldeoxyfrenolicin, deoxyfrenolicin methyl ester, and O-methyldeoxyfrenolicin methyl ester, exhibits significant inhibitory activity when tested in vitro against a variety of fungi and against an experimental ringworm infection in guinea pigs.

---

This invention relates to new organic compounds and, more particularly, is concerned with novel organic compounds of the formula:

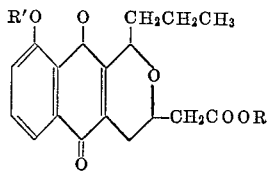

wherein R is hydrogen or lower alkyl, and R' is hydrogen, acetyl or lower alkyl. Suitable lower alkyl substituents contemplated by the present invention are those having from 1 to 4 carbon atoms such as methyl, ethyl, n-propyl, iso-propyl, etc.

In general, the novel compounds of this invention are orange-yellow or light yellow colored crystalline materials, relatively soluble in the more organic solvents as, for example, ethanol, benzene, acetone and the like.

Deoxyfrenolicin, as shown by Formula I above, wherein R and R' are hydrogen, is prepared from the antibiotic frenolicin which is described by J. C. Van Meter, M. Dann and N. Bohonos, "Antimicrobial Agents Annual—1960," New York, New York, 1961, page 77, by either of two chemical methods according to the following reaction sequence:

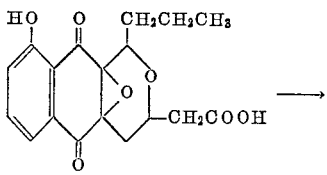

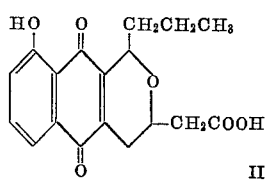

The transformation may be effected, according to the invention by either a catalyzed hydrogenation or a potassium iodide reduction. Details of the reaction conditions are given in the examples.

The novel compounds of the present invention exhibit significant inhibitory activity when tested in vitro against a variety of fungi and against an experimental ringworm infection in guinea pigs.

Table I below shows the in vitro antifungal activity of two representative compounds of this invention as compared to frenolicin, against a number of representative fungal organisms. The antifungal spectrum of these compounds was determined in a standard manner by the agar dilution technique on asparagine, meat extract, dextrose agar, and which is commonly used in testing new antifungal agents. The minimal inhibitory concentration in µg./ml. against various test organisms are reported in Table I below.

TABLE I.—ANTIFUNGAL ACTIVITY OF FRENOLICIN, DEOXYFRENOLICIN AND ACETYLDEOXYFRENOLICIN

| Organism | Minimal inhibitory concentration, µg./ml.[1] | | |
|---|---|---|---|
| | Frenolicin | Deoxy-frenolicin | Acetyldeoxyfrenolicin |
| Candida albicans, Bergen Strain, E-3 | >250 | 25 | 10 |
| Candida mycoderma, ATCC 9888 | >250 | 25 | 25 |
| Saccharomyces cerevisiae, ATCC 4100 | >250 | 2.5 | 2.5 |
| Mucor ramannianus, M-143 | >250 | 10 | 10 |
| Fusarium episphaeria, F-105 | >250 | 10 | 10 |
| Hormodendrum cladosporoides, Z-516 | >250 | 10 | 10 |
| Trichophyton mentagrophytes, E-11 | 125 | 2.5 | 2.5 |
| Microsporum gypseum, E-28 | 250 | 5 | 5 |
| Penicillium digitatum, P-308B | >250 | 10 | 10 |
| Memnoniella echinata, Z-583 | >250 | 100 | 100 |
| Chaetomium globosum, H-71, QM 6694 | 250 | 1 | 2.5 |
| Aspergillus fumigatus, S-246 | >250 | 25 | 25 |

[1] Using agar dilution technique on asparagine, meat extract, dextrose agar.

Additionally, the compounds of the present invention exhibit in vitro antibacterial activity indicating a usefulness of the compounds as industrial biocides for use, as for example, in water contamination treatment. For example, deoxyfrenolicin may be used in controlling paper mill slimes which are essentially microbiological in nature being composed of fungi or bacterial growths which entrap dirt, fiber and other debris from the system. Deoxyfrenolicin may be used in a suitable solvent system, i.e. alcohols, dimethylformamide, cellosolve, water or mixtures of such solvents, with a suitable dispersant or surfacant such as dioctyl sodium sulfosuccinate. Typical control dosage would be one which yields 150 p.p.m. of the toxicant to the system for a period of two hours each day. Alternative treatment schemes can be devised with the concentrated material or a solid formulation of carriers and surfactants formed into brickettes or packed in water soluble bags which could be dropped into the system. Dosage rates of .5 to 10 lbs. toxicant/ton of paper will probably be sufficient.

Table II below shows the results obtained with two representative compounds of this invention and frenolicin when tested against a number of representative bacterial organisms. As in Table I above, the antibacterial spectrum of these compounds, representing the amount required to inhibit the growth of various typical bacteria was determined in a standard manner by the agar dilution technique on trypticase soy agar which is commonly used, when testing new antibacterials. The minimal inhibitory concentrations expressed in µg./ml. against various test organisms are reported in Table II below.

TABLE II.—ANTIBACTERIAL ACTIVITY OF FRENOLICIN, DEOXYFRENOLICIN AND ACETYLDEOXYFRENOLICIN

| Organism | Minimal inhibitory concentration, µg./ml.[1] | | |
|---|---|---|---|
| | Frenolicin | Deoxy-frenolicin | Acetyl-deoxy-frenolicin |
| *Mycobacterium smegmatis*, ATCC 607 | >100 | 5 | 25 |
| *Staphyloccus aureus*, ATCC 6538P | 100 | 5 | 10 |
| *Streptococcus faecalis*, ATCC 8043 | >100 | 50 | 100 |
| *Bacillus subtilis*, ATCC 6633 | 50 | ≤2.5 | ≤2.5 |
| *Pseudomonas aeruginosa*, ATCC 10145 | >100 | 100 | >100 |
| *Proteus vulgaris*, ATCC 9484 | >100 | 50 | >100 |
| *Escherichia coli*, ATCC 9637 | >100 | >100 | >100 |
| *Salmonella gallinarum*, Led. An. Ind. 604 | >100 | 50 | >100 |
| *Clostridium sporogenes*, ATCC 7955 | >100 | >100 | >100 |

[1] Using agar dilution technique on trypticase soy agar.

The invention will be described in greater detail in conjunction with the following specific examples.

EXAMPLE 1

Preparation of deoxyfrenolicin

A solution of 2.0 g. of frenolicin in 40 ml. of methanol was hydrogenated at atmospheric pressure over 0.20 g. of 10% palladium charcoal catalyst. After 3 hours, slightly more than 2 moles of hydrogen had been consumed. Upon exposure of the colorless solution to the atmosphere, the solution changed immediately to a greenish yellow color. The catalyst was removed and the filtrate evaporated to a dark-green oil which partially crystallized on standing. The crude product was taken up in a minimum quantity of benzene containing a trace of methanol and chromatographed on acid-washed silica gel. Elution with benzene afforded an orange-red band which, when separated and concentrated to a small volume, gave 0.24 g. of orange-yellow crystals, M.P. 179–181° C. Further elution with a mixture of benzene and chloroform (1:3), gave an additional 0.77 g. of orange-yellow crystals, M.P. 179–181° C.

*Analysis.*—Calc'd for $C_{18}H_{18}O_6$: C, 65.44; H, 5.49. Found: C, 65.68; H, 5.84.

Structure elucidation of deoxyfrenolicin and related compounds appears in J. Amer. Chem. Soc., 88, 4109 (1966).

EXAMPLE 2

Preparation of deoxyfrenolicin

A solution of 1.78 g. of frenolicin in 100 ml. of glacial acetic acid was refluxed with 2.2 g. of potassium iodide for 45 minutes. The reaction mixture was poured into water and the yellow precipitate collected by filtration and dried to yield 1.47 g. of crude product. Recrystallization from benzene gave yellow needles, M.P. 179–181° C.

$[\alpha]_D^{25} + 112°$ (C. 1.07 in MeOH); $\nu_{max}^{KBr}$ 3010, 1725, 1665, 1650, 1625, and 1585 cm.$^{-1}$; $\lambda_{max}^{MeOH}$ 246, 274 and 415 m$\mu$ ($\epsilon$ 9070, 11400 and 4290); $\lambda_{max}^{0.1N\ NaOH\ in\ MeOH}$ 276 and 515 m$\mu$ ($\epsilon$ 12880 and 5275)

Deoxyfrenolicin obtained in this manner was shown to be identical to that obtained by the hydrogenation of frenolicin by mixed melting point, infrared and ultraviolet absorption spectra.

*Analysis.*—Calc'd for $C_{18}H_{18}O_6$: C, 65.44; H, 5.49. Found: C, 65.84; H, 5.70.

EXAMPLE 3

Preparation of acetyldeoxyfrenolicin

Deoxyfrenolicin (0.20 g.), obtained as described in Example 1 or Example 2, was dissolved in a solution of 4 ml. pyridine and 2 ml. acetic anhydride and left to stand overnight at room temperature. The next morning the solution was poured onto a mixture of ice and 10% hydrochloric acid and the resultant acidic solution was extracted with chloroform. The chloroform extract was washed with water, dried with sodium sulfate, and concentrated to a crystalline residue. Recrystallization from benzene gave 0.12 g. of pale yellow needles, M.P. 180–182° C. with softening at about 175° C.

$[\alpha]_D^{25} + 58°$ (C. 1.0 in EtOH); $\nu_{max}^{KBr}$ 3050, 1770, 1715 and 1665 cm.$^{-1}$; $\lambda_{max}^{EtOH}$ 240, 250, 263, 270, and 340 m$\mu$ ($\epsilon$ 14500, 13200, 12100, 12300, and 2980)

*Analysis.*—Calc'd for $C_{20}H_{20}O_7$: C, 64.51; H, 5.41. Found: C, 64.86; H, 5.86.

EXAMPLE 4

Preparation of deoxyfrenolicin methyl ester

Deoxyfrenolicin (0.85 g.) in a solution of methanol/ether (1:3) was treated with an excess of ethereal diazomethane. After washing with 10% sodium bicarbonate and then with water, the solution was dried with sodium sulfate and concentrated under reduced pressure to a crystalline mass. Recrystallization from hexane/benzene (5:1) afforded 0.65 g. of yellow crystals. The analytical sample was obtained by a second recrystallization from the same solvent pair: M.P. 119–120° C.;

$[\alpha]_D + 105°$ (C. 1.01 in CHCl$_3$); $\nu_{max}^{KBr}$ 1740, 1160, 1614 and 1580 cm.$^{-1}$; $\lambda_{max}^{MeOH}$ 245, 274, and 415 m$\mu$ ($\epsilon$ 9175, 11250, and 4130)

*Analysis.*—Calc'd for $C_{19}H_{20}O_6$: C, 66.27; H, 5.85. Found: C, 65.95; H, 6.08.

EXAMPLE 5

Preparation of O-methyldeoxyfrenolicin methyl ester

Frenolicin (2.0 g.) was dissolved in 25 ml. of acetone in a 50 ml. round-bottomed flask. To this solution 5 g. of anhydrous potassium carbonate and 10 ml. of methyl iodide were added and the mixture was refluxed for 4 hours. After cooling the reaction mixture was filtered and the filtrate was evaporated to dryness under reduced pressure. The crude product was dissolved in about 30 ml. of hot methanol, cooled and seeded to yield 1.85 g. of pale yellow blades of O-methylfrenolicin methyl ester: M.P. 109–110° C.; $[\alpha]_D^{25} + 39.6°$ (C. 1.06 in MeOH).

$\nu_{max}^{KBr}$ 1742, 1695 and 1587 cm.$^{-1}$; $\lambda_{max}^{MeOH}$ 229 and 347 m$\mu$ ($\epsilon$ 17,300 and 4980)

*Analysis.*—Calc'd for $C_{20}H_{22}O_7$: C, 64.16; H, 5.92. Found: C, 64.39; H, 6.01.

A solution of 0.82 g. of O-methylfrenolicin methyl etser in 60 ml. of glacial acetic acid was refluxed with 0.73 g. of potassium iodide for 45 minutes. At the end of this period the reaction mixture was poured into water and the greenish-yellow precipitate collected by filtration. Recrystallization from methanol gave 440 mg. of yellow needles: M.P. 126–127° C.; $[\alpha]_D^{25} + 68°$ (C. 1.07 in MeOH).

$\nu_{max}^{KBr}$ 1735, 1645 and 1570 cm.$^{-1}$; $\lambda_{max}^{MeOH}$ 244, 268 and 394 m$\mu$ ($\epsilon$ 13,800, 12,400 and 4170)

*Analysis.*—Calc'd for $C_{20}H_{22}O_6$: C, 67.02; H, 6.19. Found: C, 66.62; H, 6.18.

EXAMPLE 6

Deoxyfrenolicin was tested as a topical antifungal agent as described below.

Hartley strain, albino male guinea pigs, 300–500 g. (five animals per test and five controls), were infected dermally with 0.5 ml. of a 10$^{-1}$ dilution of a standard *Microsporum canis* infective hair suspension. Deoxyfrenolicin was prepared into a 5% ointment in a carbowax base. About 0.5 g. of the ointment was applied topically over the lesion once daily for 5 days, starting on day 3 postinfection. Griseofulvin, 1% in a carbowax base, was used in a similar manner for comparison purposes.

The test animals were scored on day 10 and 17 post-infection as to the relative concentration of viable organisms per hair sample, and overall lesion healing. Table III lists the results obtained in two separately run tests.

TABLE III

| Preparation tested | Hair culture score [1] 10 | Hair culture score [1] 17 | Lesion healing |
|---|---|---|---|
| Deoxyfrenolicin (5%) | 1–10 | 11–100 | No. |
| Do | 11–100 | 101–1,000 | No. |
| Griseofulvin (1%) | 0 | 1–10 | Yes. |
| Do | 0 | 1–10 | Yes. |
| Carbowax base | 1,000+ | 1,000+ | No. |
| Do | 1,000+ | 1,000+ | No. |

[1] Relative concentration of viable organisms per hair sample scored on the 10th and 17th day postinfection.

When tested in the above-described manner, deoxyfrenolicin produces a significant reduction in the viable spore count at the site of infection.

We claim:

1. A deoxyfrenolicin of the formula:

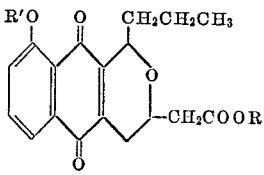

wherein R is hydrogen or lower alkyl, and R' is hydrogen, acetyl or lower alkyl.

2. The deoxyfrenolicin according to claim 1: deoxyfrenolicin.

3. The deoxyfrenolicin according to claim 1: acetyldeoxyfrenolicin.

4. The deoxyfrenolicin according to claim 1: deoxyfrenolicin methyl ester.

5. The deoxyfrenolicin according to claim 1: O-methyl-deoxyfrenolicin methyl ester.

References Cited

Ellestad et al., J. Amer. Chem. Soc., vol. 88, pp. 4109–10 (1966).

HENRY R. JILES, *Primary Examiner.*

J. M. FORD, *Assistant Examiner.*

U.S. Cl. X.R.

260—999; 424—283